(12) United States Patent
Idoine et al.

(10) Patent No.: US 8,735,837 B2
(45) Date of Patent: May 27, 2014

(54) GAMMA CAMERA SYSTEM

(76) Inventors: John D. Idoine, Mount Vernon, OH (US); Kelly E. Statham, Cleveland Heights, OH (US)

(*) Notice: Subject to any disclaimer, the term of this patent is extended or adjusted under 35 U.S.C. 154(b) by 814 days.

(21) Appl. No.: 12/949,495

(22) Filed: Nov. 18, 2010

(65) Prior Publication Data
US 2011/0114844 A1 May 19, 2011

Related U.S. Application Data

(60) Provisional application No. 61/262,265, filed on Nov. 18, 2009.

(51) Int. Cl.
*G21K 1/02* (2006.01)
(52) U.S. Cl.
USPC ....................................... 250/363.1
(58) Field of Classification Search
USPC ....................................... 250/363.1
See application file for complete search history.

(56) References Cited

U.S. PATENT DOCUMENTS

| | | | |
|---|---|---|---|
| 3,914,611 A | 10/1975 | Stout | |
| 4,506,374 A * | 3/1985 | Flynn | 378/2 |
| 4,582,994 A | 4/1986 | Berg | |
| 5,138,642 A * | 8/1992 | McCroskey et al. | 378/19 |
| 5,150,394 A * | 9/1992 | Karellas | 378/62 |
| 5,448,364 A * | 9/1995 | Moran | 356/430 |
| 5,521,386 A * | 5/1996 | Taboada | 250/363.02 |
| 6,633,669 B1 * | 10/2003 | Atkinson | 382/174 |
| 8,414,754 B1 * | 4/2013 | Santiago et al. | 204/549 |
| 2009/0140157 A1 * | 6/2009 | Meng | 250/370.11 |

OTHER PUBLICATIONS

Gerralt A. De Vree; Photon-Counting Gamma Camera Based on an Electron-Multiplying CCD;ISSN: 0018-9499, IEEE Transactions on Nuclear Science, vol. 52, No. 3, Part I, Jun. 2005, pp. 580-588,IEEE Nuclear and Plasma Science Society, United States.

* cited by examiner

*Primary Examiner* — David Porta
*Assistant Examiner* — Mindy Vu
(74) *Attorney, Agent, or Firm* — Emerson Thomson Bennett, LLC; Roger D. Emerson; Sergey Vernyuk

(57) ABSTRACT

A gamma radiation detecting apparatus includes a gamma radiation collimator, a scintillation crystal, a charge coupled device, and an electronic device. The collimator receives and collimates gamma radiation. The scintillation crystal receives the gamma radiation from the gamma radiation collimator and converts the gamma radiation into visible light. The charge coupled device receives the visible light from the scintillation crystal and converts the visible light into an electrical charge. The electronic device converts the electrical charge into a digital image.

20 Claims, 7 Drawing Sheets

GAMMA CAMERA SYSTEM

CROSS-REFERENCE TO RELATED APPLICATIONS

This application claims the benefit of U.S. Provisional Application No. 61/262,265, titled EMCCD CAMERA, filed Nov. 18, 2009, which is herein incorporated by reference.

I. BACKGROUND

A. Field of Invention

The present invention relates generally to detecting gamma radiation and more specifically to gamma camera systems.

B. Description of the Related Art

It is known in the art to use gamma cameras to create multi-dimensional images of the distribution of gamma emitting sources for applications including, but not limited to, medicine, astronomy, and detection of contraband. Current state of the art photon counting, large field-of-view, imaging gamma cameras utilize a plurality of photomultiplier tubes optically coupled to one side or edge of a scintillation crystal. The other side of the scintillation crystal is exposed to the radioactive source to be imaged via a gamma-ray collimator. When a gamma-ray photon interacts within the crystal, visible light is emitted by the crystal at the point of the interaction. This visible light from the interaction strikes many photomultiplier tubes (PMT's). The position of the gamma interaction is mathematically determined by analyzing the outputs of the photomultiplier tubes and is well known in the art. The energy deposited in the crystal by the incident gamma ray is proportional to the total amount of visible light emitted by the crystal. This is determined by integrating the outputs of the photomultiplier tubes, also well known in the art.

While known gamma cameras function well for their intended purpose, there are limitations. Some disadvantages in the known technology include, but are not limited to, the following. Photomultiplier tube performance tends to drift with temperature and time making frequent calibration necessary. Photomultiplier tube performance depends on their position within the earth's magnetic field. Determination of the position of an interaction is difficult because the detection area of the PMT is much larger than the size of the scintillation event or interaction, resulting in an image with low spatial resolution. Scintillation crystal exchange is difficult due to the direct optical coupling of the PMT's to the crystal. Therefore, what is needed are apparatus and methods that overcome the limitations of the prior art. The present invention overcomes one or more of the disadvantages of the prior art.

II. SUMMARY

According to one embodiment of this invention, a gamma radiation detecting apparatus includes a gamma radiation collimator which receives and collimates gamma radiation; a scintillation crystal which receives the gamma radiation from the gamma radiation collimator and converts the gamma radiation into visible light; and a charge coupled device which receives the visible light from the scintillation crystal and converts the visible light into an electrical charge. The charge coupled device can be an electron multiplying charge coupled device or an intensified charge coupled device. The gamma radiation collimator can be a parallel-hole collimator or a coded aperture collimator. The gamma radiation detecting apparatus can include an optical lens, which focuses the visible light from the scintillation crystal on the charge coupled device. The gamma radiation detecting apparatus can include a mirror that redirects the visible light received from the scintillation crystal to the charge coupled device, wherein the charge coupled device positioned so that it is not directly exposed to gamma radiation. The gamma radiation detecting apparatus can include one or more light collecting mirrors, which collect and focus the visible light from the scintillation crystal onto the charge coupled device. The light collecting mirror can separate the visible light from the gamma radiation flux received through the scintillation crystal, thus preventing exposure of the charge coupled device to gamma radiation.

The gamma radiation detecting apparatus can include a second mirror, which redirects the visible light from the light collecting mirror to the charge coupled device. In some embodiments, the second mirror directs the visible light to the charge coupled device, which allows the charge coupled device to be positioned so that it is not directly exposed to gamma radiation. In other embodiments, the second mirror is partially silvered to split the visible light and direct the visible light to the charge coupled device and to one or more photomultiplier tubes, and to allow the charge coupled device to be positioned so that it is not directly exposed to gamma radiation. The gamma radiation detecting apparatus can include a beam splitter located between the scintillation crystal and the charge coupled device, wherein the beam splitter splits the visible light and directs the visible light to the charge coupled device. In some embodiments, the beam splitter splits the visible light and directs the visible light to the charge coupled device and one or more photomultiplier tubes.

The gamma radiation detecting apparatus can include a first electronic device, which reads and processes the output of the charge coupled device to create digital data of an image. In some embodiments, the first electronic device analyzes the image and determines whether the gamma radiation was scattered. The gamma radiation can be from a single gamma ray interaction within the scintillation crystal. The first electronic device can be separate from the charge coupled device or integrated with the charge coupled device. The first electronic device can determine the position of the gamma radiation interaction within the scintillation crystal by analyzing the pixels of the charge coupled device. The first electronic device can determine the position of the gamma radiation interaction within the scintillation crystal by analyzing the digital data of the image. The gamma radiation detecting apparatus can include a second electronic device connected to the first electronic device and running software to process the digital data and display the image. The second electronic device can be a computer, which includes software to extract the position of a single gamma ray interaction from the image, correct the image for optical aberrations, and further enhance the image.

The one or more photomultiplier tubes can detect a single gamma interaction within the scintillation crystal, which allows processing of the digital data of the image for that one event. The one or more photomultiplier tubes can determine the energy deposited in the crystal by the gamma ray to eliminate any scattered photons from the image. The gamma radiation detecting apparatus can include a zoom lens located between the scintillation crystal and the charge coupled device, wherein the zoom lens can vary the spatial resolution anywhere in between and including a high spatial resolution for imaging a portion of the scintillation crystal and a low resolution for imaging substantially the entire scintillation crystal. The gamma radiation detecting apparatus can include a cooling device, which cools the charge coupled device.

According to another embodiment, a method includes the steps of: converting gamma radiation into visible light using a gamma radiation collimator with a scintillation crystal; focusing the visible light on a charge coupled device; converting visible light into an electrical signal using the charge coupled device; and processing the electrical signal from the charge coupled device into an image using an electronic device electrically coupled to the charge coupled device. The method can include the steps of determining the position of the gamma radiation interaction within the scintillation crystal by analyzing the pixels of the image produced by charge coupled device. The step of focusing the visible light can further include the steps of splitting the visible light using a beam splitter and directing the first beam of visible light to the charge coupled device and the second beam of visible light to one or more photomultiplier tubes.

One advantage of this invention is that the position of the gamma radiation interaction or event within the scintillation crystal can be accurately determined. Another advantage of this invention is the scintillation crystals can be easily exchanged. Another advantage is that subsections of the scintillation crystal can be imaged at a higher spatial resolution.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
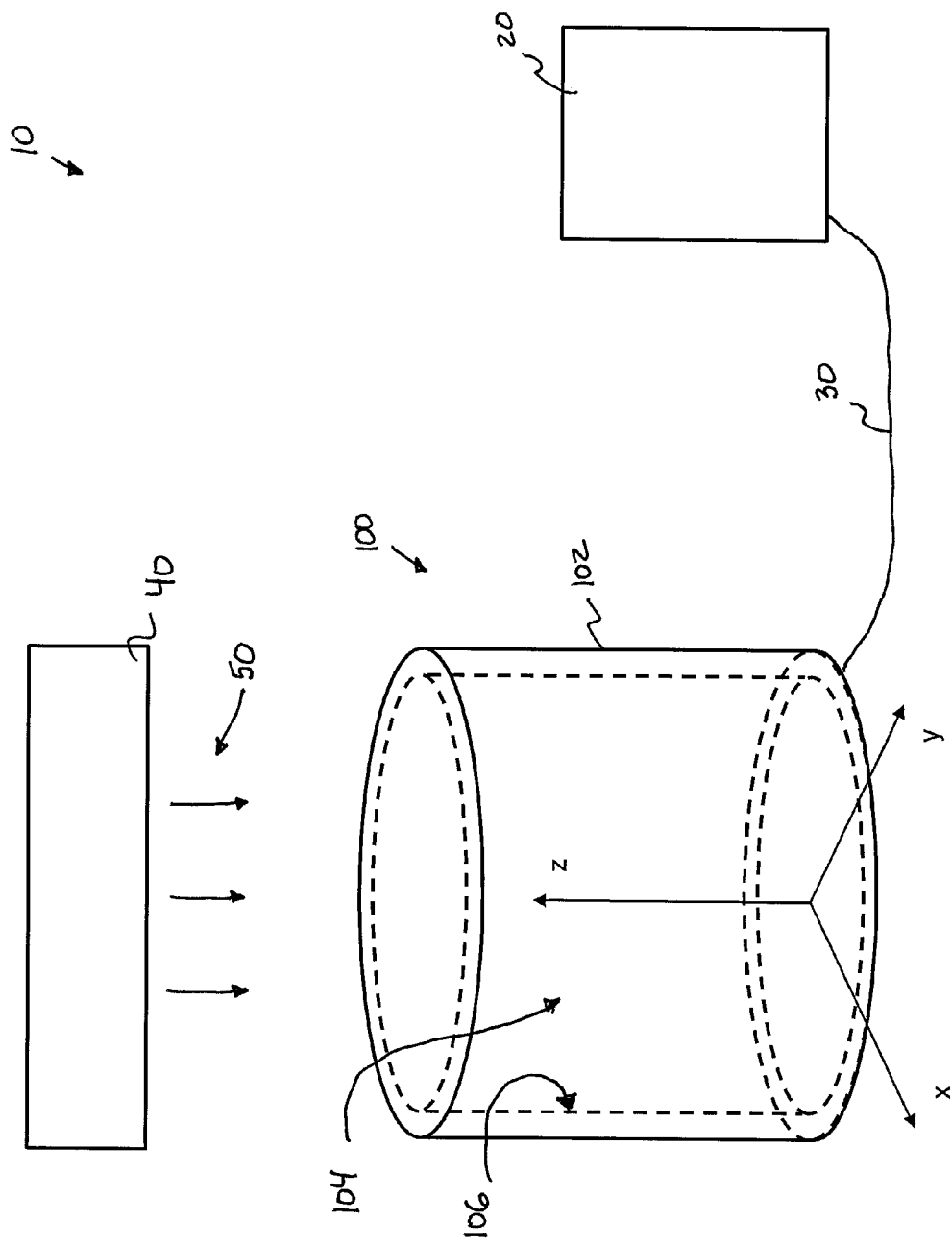
FIG. 1 is a schematic of a gamma camera system, according to one embodiment.

Referring now to the drawings wherein the showings are for purposes of illustrating embodiments of the invention only and not for purposes of limiting the same, and wherein like reference numerals are understood to refer to like components, FIG. 1 shows a gamma camera system 10 including a gamma camera 100 and an electronic device 20 for processing the image produced by the gamma camera 100, according to one embodiment of this invention. The gamma camera 100 can be a photon counting, large field-of-view imaging gamma camera utilizing one or more charge coupled devices (CCD's) to determine the position of a gamma ray on an x-y plane. The gamma camera 100 can include one or more photomultiplier tubes (PMT's) for energy discrimination. "Large field-of-view" is defined to mean the area of interest on scintillation crystal is larger than the light detecting device, for example, a single PMT or a singe CCD. The gamma camera 100 can include an optical system, which can include one or more optical lenses, one or more mirrors, or both to focus an image of the visible light emitted by a scintillation crystal onto one or more light detecting devices, such as a CCD.

The sensitivity of the gamma camera 100 can be increased either by using an intensified CCD (ICCD), which includes an optical image intensifier, or by using an electron multiplying CCD (EMCCD), which includes an electron multiplying CCD technology. By incorporating on-chip multiplication gain, the EMCCD achieves the single-photon detection sensitivity typical of intensified or electron-bombarded CCDs at much lower cost and without compromising the quantum efficiency and resolution characteristics of the conventional CCD structure. A gamma radiation source 40 emits one or more gamma rays 50 that the gamma camera 100 can detect and determine the location of the interaction of a single gamma ray within the scintillation crystal. The position of the gamma ray interaction within the scintillation crystal on an x-y plane is easily determined by analyzing the pixels of the CCD. The resolution of the CCD gamma camera 100 greatly exceeds the resolution of a typical PMT gamma camera. The resolution of a CCD can be in microns compared to the resolution of several millimeters for the PMT technique.

With reference to FIGS. 1-6, the connection 30 between the electronic device 20 and the gamma camera 100 can be a wired or wireless connection. In some embodiments, the electronic device 20 is a computer that can control the gamma camera 100 and runs image processing software. In some embodiments, the computer 20 includes software, which can perform one or more of the following functions: extract the position of a single gamma ray interaction from the image, correct the image for optical aberrations or other errors, or further enhance the image. The gamma camera 100 can include a housing 102 to contain some or all of the components of the gamma camera 100 within the interior 104 of the housing 102. The housing 102 may include a non-reflective coating on the interior surface 106 to prevent unwanted reflection of scintillation light or visible light. The gamma camera 100 can include shielding 200 to prevent the scintillation crystal and the charge coupled device from being exposed to unwanted gamma radiation. This shielding 200 can include, but is not limited to, lead, lead alloys, tungsten, tungsten alloys, and other heavy metal shielding. In some embodiments, the shielding 200 is a tungsten alloy "Kulite" manufactured by H.C. Stark, Inc., 1250 East $222^{nd}$ St., Euclid, Ohio, 44117. In one embodiment, the shielding 200 is the tungsten alloy Kulite K-1750. The gamma camera 100 can also include shielding to protect or shield the charge coupled device and the photomultiplier tubes from unwanted visible light.

The gamma camera 100 can include various components located within the interior 104 of the housing 102. In one embodiment, the gamma camera 100 can include a gamma ray collimator 110, a scintillation crystal 120, and a charge coupled device (CCD) or other light detecting device 130. In some embodiments, the CCD 130 can be directly coupled to the scintillation crystal 120. In other embodiments, a plurality of CCD's 130 can be directly coupled to the scintillation crystal 120. The gamma ray collimator 110 can be a parallel-hole collimator, a coded aperture, or any other type of collimator chosen by a person of ordinary skill in the art. The charge coupled device 130 can be an electron multiplying CCD (EMCCD), an intensified CCD (ICCD), which includes an image intensifier, or any other type of CCD chosen by a person of ordinary skill in the art. In one embodiment, the CCD 130 is an EMCCD from E2V Technologies PLC, 106 Waterhouse Lane, Chelmsford, Essex CM1 2QU, England. In some embodiments, a plurality of CCD's 130 can be used.

The gamma camera 100 can include lead or other radiation shielding 200, chosen by a person of ordinary skill in the art, to protect the CCD from exposure to gamma rays.

With continuing reference to FIGS. 1-6, the gamma camera 100 can include an electronic device 150. The electronic device 150 can be a separate device or can be integrated with the CCD 130. The electronic device 150 includes electronics to read and process the output of the CCD 130. In some embodiments, the electronic device 150 is an analog-to-digital converter (ADC), which converts each pixel's value into a digital value by measuring the amount of charge and converting the measurement to binary form. The digital output or data contains all of the information from the pixels of the CCD 130. In some embodiments, the electronic device 150 can determine the position of the gamma ray interaction within the scintillation crystal 120 by analyzing the pixels of the CCD 130. In some embodiments, the electronic device 150 includes a digital signal processor (DSP). In other embodiments, the electronic device 150 includes an analog-to-digital converter (ADC) and a digital signal processor (DSP). In one specific embodiment, the CCD 130 includes all of the electronics to receive visible light and convert the visible light into a digital image (CCD image). The electronic device 150 can analyze the CCD image from a single event and determine if that gamma ray was scattered. If the gamma ray was scattered, the digital image can be rejected.

Figure 2:
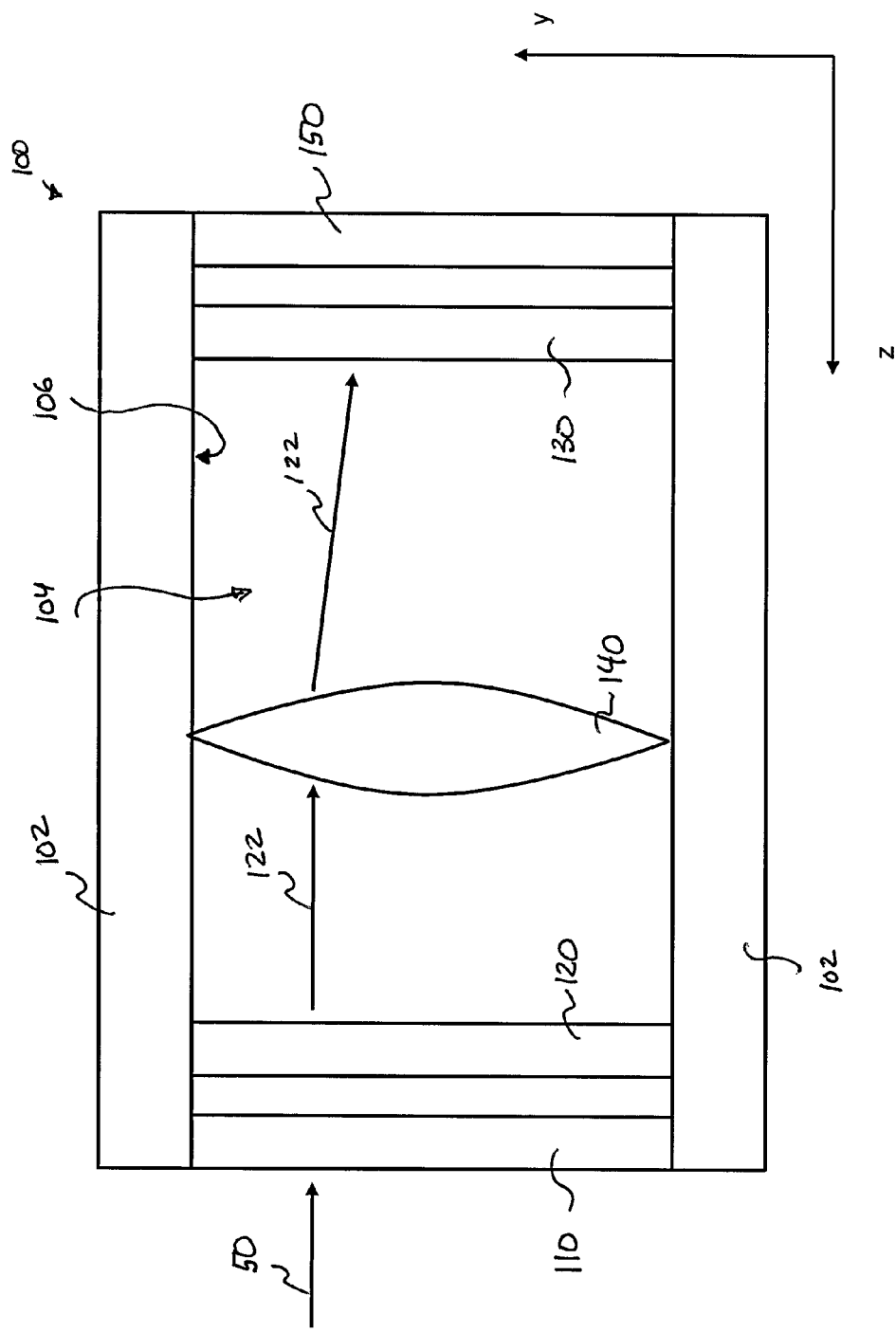
FIG. 2 is a schematic of the interior of a gamma camera, according to one embodiment.

With reference to FIG. 2, the gamma camera includes a housing 102, a gamma ray collimator 110, a scintillation crystal 120, an optical lens 140, a charge coupled device 130, and an electronic device 150. The optical lens 140 can focus the visible light 122 produced by the scintillation crystal 120 onto the charge coupled device 130. The optical lens 140 can be a single or multiple lenses. In some embodiments, the optical lens 140 is a zoom lens. In other embodiments, the optical lens 140 is a converging lens.

Figure 3:
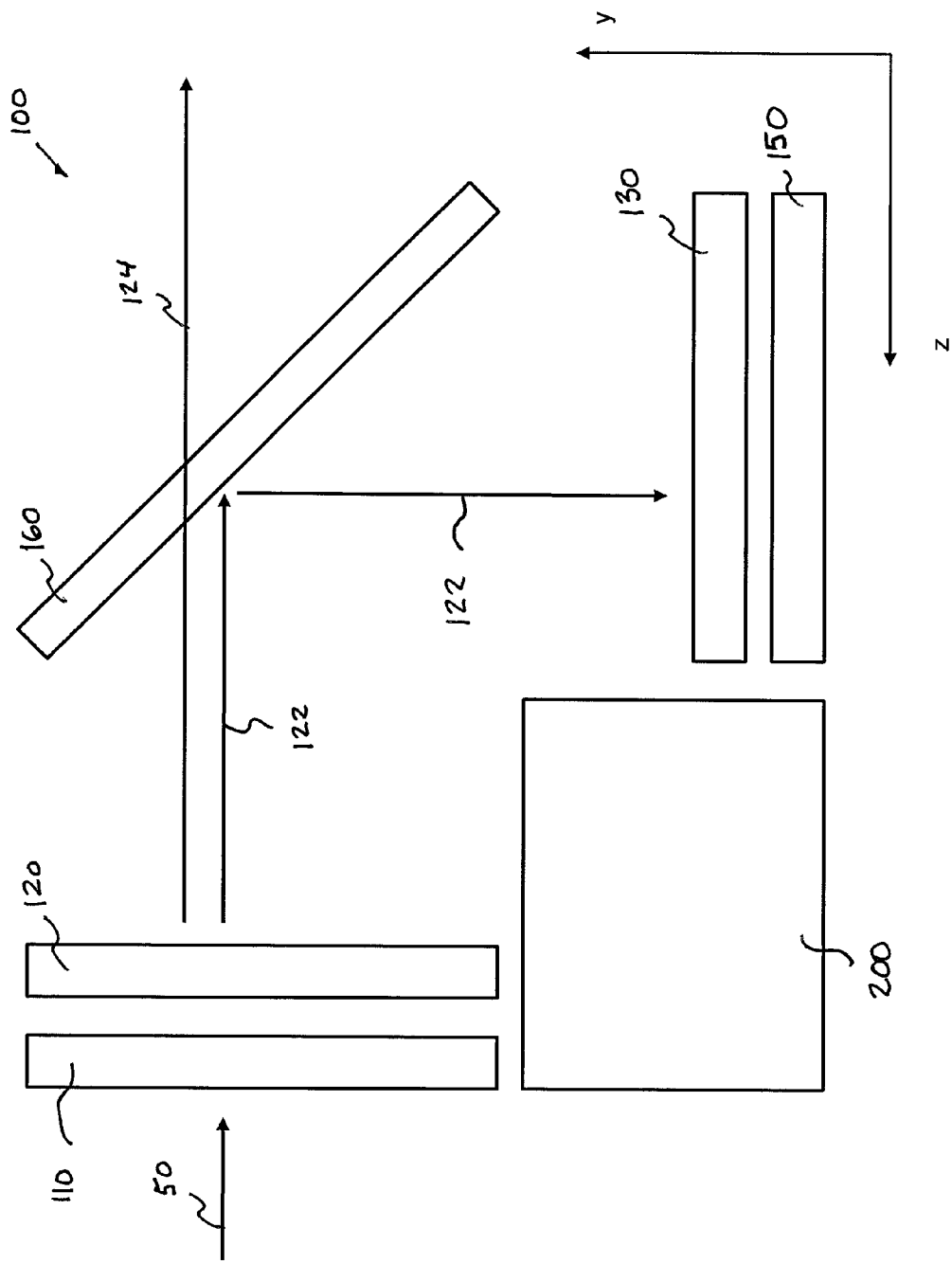
FIG. 3 is a schematic of the interior of a gamma camera, according to one embodiment.

With reference to FIG. 3, the interior 104 of the gamma camera 100 includes a gamma ray collimator 110, a scintillation crystal 120, a mirror 160, a charge coupled device 130, an electronic device 150, and shielding 200. The mirror 160 redirects the visible light 122 received from the scintillation crystal 120 to the CCD 130. In some embodiments, the mirror 160 can separate the visible optical scintillation light 122, from the non-interacting gamma ray flux 124 preventing the CCD 130 from exposure to gamma radiation.

Figure 4:
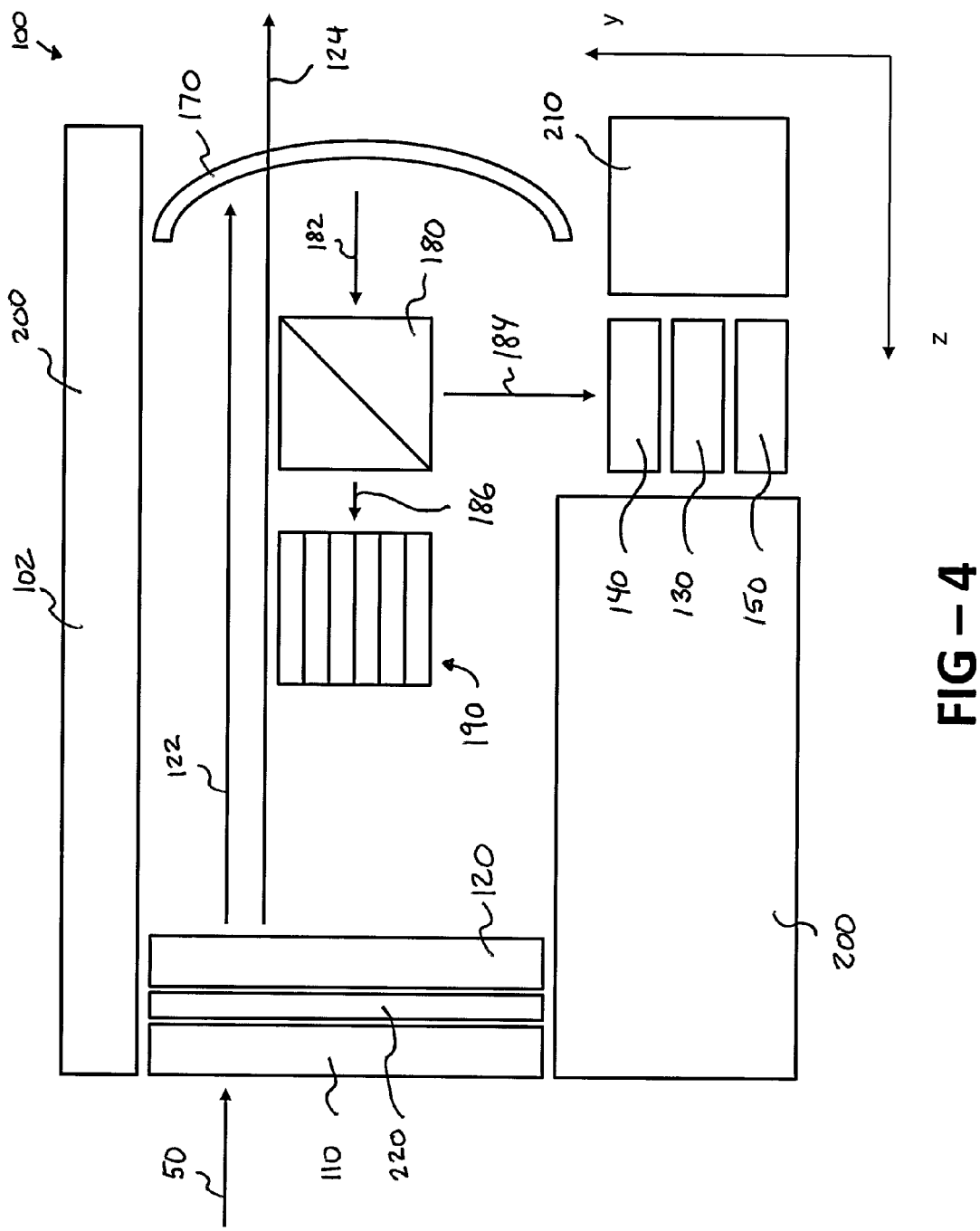
FIG. 4 is a schematic of the interior of a gamma camera, according to one embodiment.
Figure 5:
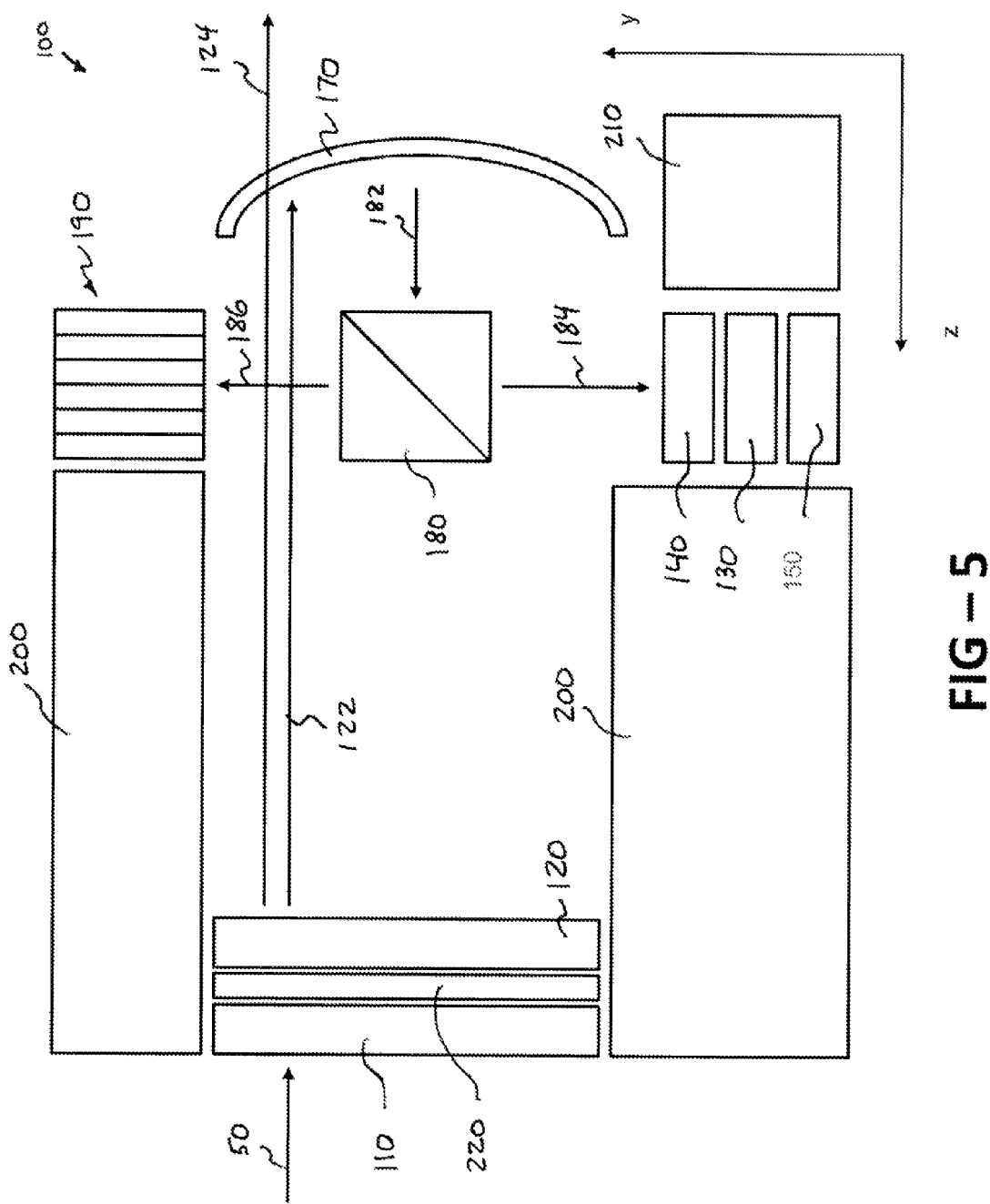
FIG. 5 is a schematic of the interior of a gamma camera, according to one embodiment.
Figure 6:
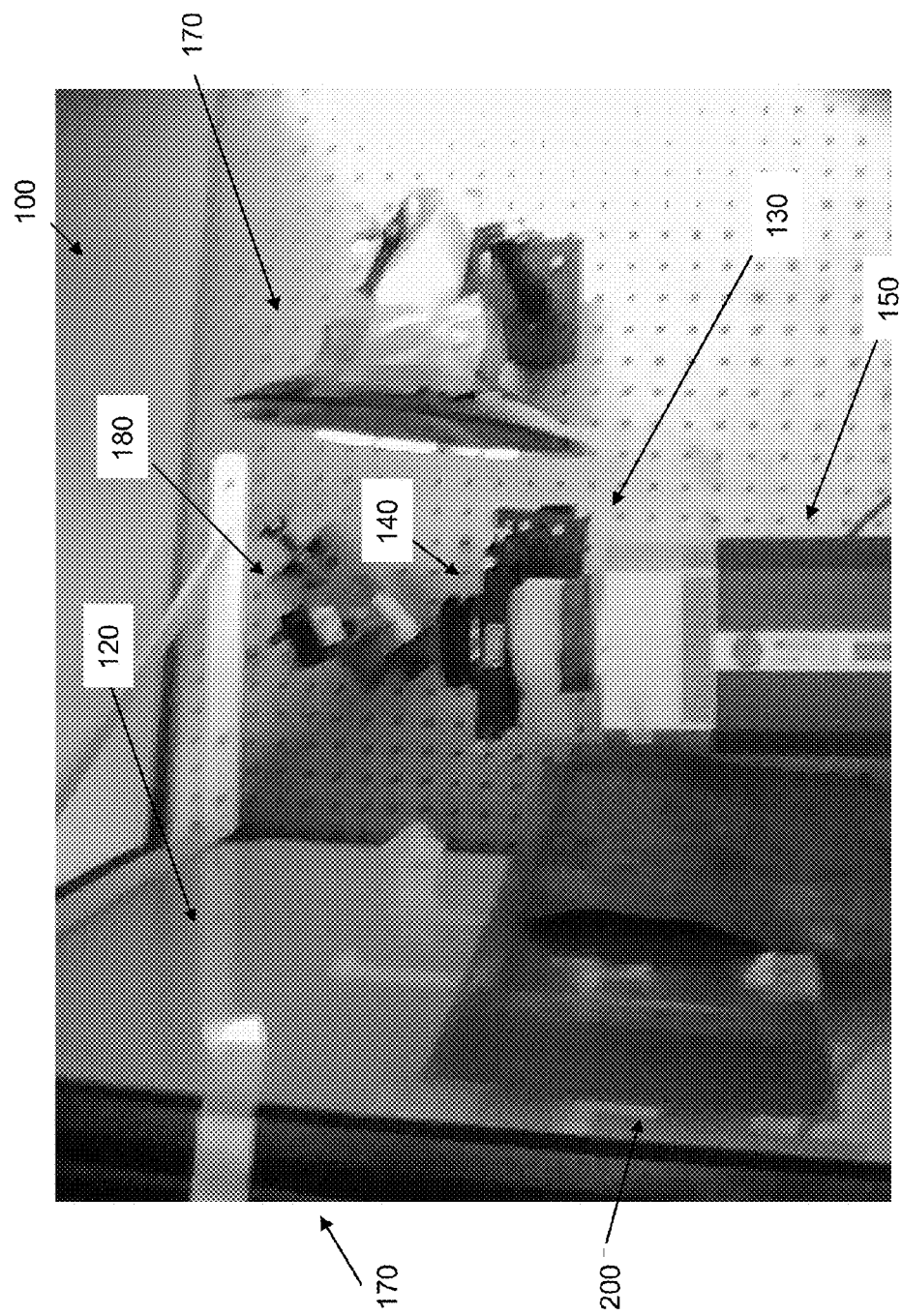
FIG. 6 is a perspective view of the interior of a gamma camera, according to one embodiment.

With reference to FIGS. 4-6, the gamma camera 100 can include a gamma ray collimator 110, a scintillation crystal 120, a light collecting mirror 170, a beam splitter 180, an optical lens 140, a charge coupled device 130, and an electronic device 150. The gamma camera 100 can also include one or more photomultiplier tubes (PMT's) 190. The gamma ray collimator 110 can be a lead, lead alloy, tungsten, tungsten alloy, or any other heavy metal collimator chosen by a person of ordinary skill in the art. In some embodiments, the collimator 110 is a tungsten alloy "Kulite." In one embodiment, the collimator 110 is the tungsten alloy Kulite K-1750. The scintillation crystal 120 can be a NaI (TI) scintillation crystal or any other scintillation crystal chosen by a person of ordinary skill in the art. In some embodiments, the optical lens 140 can be a zoom lens to magnify a subsection or portion of the scintillation crystal 120 and to allow optimal imaging quality in the CCD 130.

The light collecting mirror 170 receives the visible light 122 from the scintillation crystal 120. The light collecting mirror 170 collects and focuses the visible light 122. In some embodiments, the light collecting mirror 170 is a type of curved mirror including, but not limited to, a parabolic mirror or a spherical mirror. The light collecting mirror 170 can separate the visible light 122 from the gamma radiation flux 124 received through the scintillation crystal, thus preventing exposure of the charge coupled device 130 to gamma radiation. The beam splitter 180 splits the optical image 182, the visible light, from the light collecting mirror 170 into two separate beams 184, 186. The beam splitter 180 can be from about 10% to about 90% reflective, inclusive. The beam splitter 180 can direct one of the two optical images 184 to the CCD 130 and the other optical image 186 to one or more photomultiplier tubes (PMT's) 190 and their associated readout and processing electronics. The beam splitter 180 allows the CCD 130 to be positioned so that the CCD 130 is not directly exposed to gamma radiation. In some embodiments, the beam splitter 180 is a partially or half-silvered mirror. In other embodiments, the beam splitter 180 includes multiple mirrors or lenses to redirect the separate images 184, 186, as shown in FIG. 5.

The visible light 186 sent to the PMT or PMT's 190 allows detection of a single gamma interaction within the scintillation crystal 120, which allows processing of the CCD data for just that one event. The single PMT or multiple PMT's 190 can be used to determine the energy deposited in the crystal 120 by the gamma ray 50 to eliminate scattered photons from the image produced by the CCD 130 and the associated electronics. The PMT's 190 can be standard or silicon PMT's or any other PMT's chosen by a person of ordinary skill in the art. The PMT's 190 can be directly coupled to the edges of the scintillation crystal 120 or the PMT's can be exposed to the scintillation light, or visible light, through the optical system of one or more lenses, one or more mirrors, or a combination of a lens or lenses and a mirror or mirrors. The beam splitter 180 and the PMT's 190 are positioned to minimize obstruction of the visible light 122 traveling from the scintillation crystal 120 to the light collecting mirror 170. In some embodiments, the PMT's are positioned so they do not obstruct or interfere with any visible light 122. One purpose or function of the PMT's is to detect a gamma interaction within the crystal 120 and then trigger acquisition of the image in the CCD for the single gamma event. Another purpose or function of the PMT's is to measure the energy deposited by a single gamma allowing elimination of scattered gammas from the CCD image.

With continuing reference to FIGS. 4-6, the gamma camera 100 can include a thermoelectric or other cooling device to cool the CCD 130 for optimal performance. The gamma camera 100 can also include a gamma transparent apparatus 220 located between the gamma ray collimator 110 and the scintillation crystal 120. This apparatus 220 allows for collection of scintillation light from either side or both sides of the scintillation crystal 120. In some embodiments, the apparatus 220 is a system of mirrors and lenses, which collect scintillation light from the collimator side of the crystal 120. This light on the collimator side of the crystal 120 could be processed in the same manner as the visible light 122 exiting on the opposite side of the crystal 120. In some embodiments, a CCD 130 could be positioned on the collimator side of the crystal 120 in addition to the system of mirrors and lenses 200. In other embodiments, one or more CCD's 130 could be positioned on each side of the crystal 120. The use of the apparatus 220 can increase the sensitivity of the gamma camera 100 when used for two-sided light collection from the crystal 120. The use of the apparatus 220 can reduce the size of the gamma camera 100 when used with in conjunction with a coded aperture 110.

Figure 7:
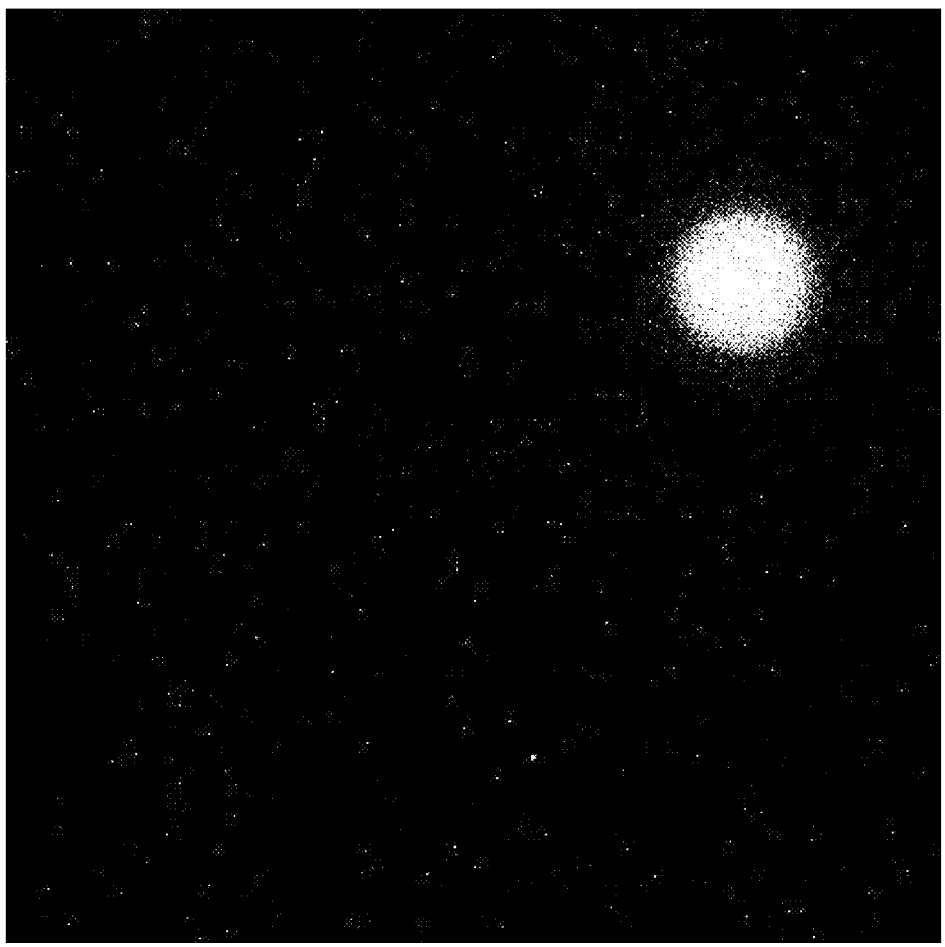
FIG. 7 is a recorded image from the gamma camera, according to one embodiment.

With reference to FIG. 7, a recorded image from the gamma camera shows a 5mCi Tc-99m source collimated through a 1 cm diameter, 10 cm long lead collimating tube, illustrating the clinically useful sensitivity and resolution of the gamma camera of the present invention.

With reference to all the FIGURES, the gamma camera 100 can include one or more mechanisms for positioning all the necessary components of the camera and for positioning the entire camera. In some embodiments, the gamma camera 100 includes a mechanism for moving and focusing the components of the optical system components, which include, but are not limited to, mirrors, beam splitters, and optical lenses. This mechanism allows imaging of substantially the entire scintillation crystal or imaging of a subsection or portion of the scintillation crystal at high spatial resolution or magnification (zoom). The mechanism can be a motorized mechanism under computer control. In some embodiments, the gamma camera 100 can include a mechanism for exchanging scintillation crystals 120. In the embodiments where the PMT's are not directly optically coupled to the scintillation crystal 120, the scintillation crystal 120 can be easily exchanged to study radioisotopes of differing energies. In some embodiments, the gamma camera 100 can include a mechanism for exchanging collimators 110.

The operation of the gamma camera 100 will now be discussed, according to some embodiments. A gamma radiation source 40 emits a gamma ray 50, which enters and passes through the collimator 110. The gamma ray exits the collimator and enters the scintillation crystal 120, where the crystal converts the gamma ray into visible light 122. A light collecting mirror 170 redirects the visible light 182 to a partially silvered mirror or beam splitter 180. The visible scintillation light 182 is split into two beams, with the first beam 184 being directed towards a CCD 130 and the second beam 186 being directed towards one or more PMT's. The first beam 184 enters an optical lens or zoom lens 140 before striking the CCD 130. The second beam 186 enters one or more PMT's 190, which can sample the total visible light emitted by the scintillation crystal 120. The location of the gamma ray interaction within the scintillation crystal 120 on the x-y plane can be determined by analyzing the pixels of the CCD 130 or image created by the CCD 130 and the associated electronics. One or more PMT's 190 can detect that a single gamma event has occurred within the scintillation crystal 120 and can determine the light output from the crystal 120 for energy discrimination and elimination of scattered gammas. When the PMT or PMT's 190 receive the first beam 184, the PMT's 190 can signal the CCD 130 and the electronics 150 to reject the data from that gamma ray if it is determined to be scattered.

The gamma camera 100 can reject scattered gammas so they are not included in the image produced from the CCD 130. The gamma camera can prevent scattered gamma rays from being included in the image by at least two different methods. The first method uses the PMT's 190 to determine the gamma energy deposited in the crystal 120. The second method analyzes the pixels of the CCD image to determine the gamma energy deposited in the crystal 120. Any data from gammas having lost energy through scattering is rejected. Many other configurations using a CCD 130 to determine the location of the gamma ray interaction within a scintillation crystal have been contemplated and are within the scope of this invention.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

We claim:

1. A gamma radiation detecting apparatus comprising:
    a gamma radiation collimator which receives and collimates gamma radiation;
    a scintillation crystal which receives the gamma radiation from the gamma radiation collimator and converts the gamma radiation into visible light;
    a light-collecting mirror which collects and focuses the visible light received from the scintillation crystal;
    a beam splitter which splits and directs the visible light from the light-collecting mirror into at least two beams;
    an optical lens which focuses a first beam of the visible light from the beam splitter;
    a charge coupled device which receives the visible light from the optical lens and converts the visible light into an electrical charge;
    shielding which prevents the charge coupled device and the scintillation crystal from being exposed to unwanted gamma radiation; and
    at least one light detector which receives a second beam of the visible light from the beam splitter and measures total energy of the second beam;
    wherein the charge coupled device is positioned so that it is not directly exposed to gamma radiation; and
    wherein the light-collecting mirror splits the visible light from the gamma radiation flux received through the scintillation crystal, preventing exposure of the charge coupled device to gamma radiation.

2. The gamma radiation detecting apparatus of claim 1, wherein the charge coupled device is an electron multiplying charge coupled device.

3. The gamma radiation detecting apparatus of claim 1, wherein the charge coupled device is an intensified charge coupled device.

4. The gamma radiation detecting apparatus of claim 1, wherein the gamma radiation collimator is a parallel-hole collimator.

5. The gamma radiation detecting apparatus of claim 1, wherein the gamma radiation collimator is a coded aperture collimator.

6. The gamma radiation detecting apparatus of claim 1, wherein the beam splitter comprises a second mirror that is partially silvered to split and direct the visible light.

7. The gamma radiation detecting apparatus of claim 1 further comprising:
    a first electronic device which reads and processes the output of the charge coupled device to create digital data of an image, wherein the first electronic device analyzes the image and determines whether the gamma radiation was scattered.

8. The gamma radiation detecting apparatus of claim 7, wherein the first electronic device determines the position of the gamma radiation interaction within the scintillation crystal by analyzing the pixels of the charge coupled device.

9. The gamma radiation detecting apparatus of claim 7 further comprising:
    a second electronic device connected to the first electronic device and running software to process the digital data and display the image, wherein the software extracts the position of a single gamma ray interaction from the image.

10. The gamma radiation detecting apparatus of claim 1, wherein the optical lens comprises a zoom lens which can vary the spatial resolution anywhere in between and including a high spatial resolution for imaging a portion of the scintillation crystal and a low resolution for imaging substantially the entire scintillation crystal.

11. The gamma radiation detecting apparatus of claim 1 further comprising:
a cooling device which cools the charge coupled device.

12. The gamma radiation detecting apparatus of claim 1, wherein the at least one light detector measures energy deposited by gamma rays during one gamma event by integrating the amount of visible light emitted by the scintillation crystal during one gamma event; and
wherein the at least one light detector triggers acquisition of an image by the charge coupled device on detection of a gamma interaction.

13. The gamma radiation detecting apparatus of claim 12, wherein the at least one light detector comprises a photomultiplier tube.

14. The gamma radiation detecting apparatus of claim 1, wherein the charge coupled device comprises a plurality of charge coupled devices.

15. A method comprising the steps of:
(a) collimating gamma radiation with a gamma radiation collimator;
(b) positioning a charge coupled device so that it is not directly exposed to the gamma radiation;
(c) shielding the charge coupled device and a scintillation crystal from being exposed to unwanted gamma radiation;
(d) converting the collimated gamma radiation into visible light using the scintillation crystal;
(e) collecting and focusing the visible light using a light-collecting mirror such that the visible light is split from the gamma radiation flux received through the scintillation crystal;
(f) splitting and directing the visible light into at least two beams using a beam splitter;
(g) focusing a first beam of the visible light on the charge coupled device using an optical lens;
(h) directing a second beam of the visible light onto at least one light detector;
(i) measuring total energy of the second beam using the at least one light detector;
(j) converting the first beam of the visible light into an electrical signal using the charge coupled device; and
(k) processing the electrical signal from the charge coupled device into an image using an electronic device electrically coupled to the charge coupled device.

16. The method of claim 15 further comprising the steps of:
determining the position of the gamma radiation interaction within the scintillation crystal by analyzing the pixels of the image produced by the charge coupled device.

17. The method of claim 16, wherein step (i) further comprises:
integrating the amount of visible light emitted by the scintillation crystal during one gamma event, and eliminating scattered gammas from the image of step (k).

18. The method of claim 17, wherein step (k) is triggered by the at least one light detector detecting a gamma interaction.

19. A gamma radiation detecting apparatus comprising:
a gamma radiation collimator which receives and collimates gamma radiation;
a scintillation crystal which receives the gamma radiation from the gamma radiation collimator and converts the gamma radiation into visible light;
a light-collecting mirror which collects and focuses the visible light received from the scintillation crystal;
an optical lens which focuses the visible light from the light-collecting mirror;
an electron multiplying charge coupled device which receives the visible light from the optical lens and converts the visible light into an electrical charge;
a gamma-transparent apparatus, located between the gamma radiation collimator and the scintillation crystal, which collects visible light from at least one side of the scintillation crystal;
at least one light detector which receives the visible light from the gamma-transparent apparatus and measures total energy of the received light;
shielding which prevents the electron multiplying charge coupled device and the scintillation crystal from being exposed to unwanted gamma radiation; and
a first electronic device which reads and processes the output of the electron multiplying charge coupled device to create digital data of an image, wherein the first electronic device analyzes the image and determines whether the gamma radiation was scattered; and wherein the first electronic device determines the position of the gamma radiation interaction within the scintillation crystal by analyzing the pixels of the charge coupled device;
wherein the electron multiplying charge coupled device is positioned so that it is not directly exposed to gamma radiation;
wherein the light-collecting mirror splits the visible light from the gamma radiation flux received through the scintillation crystal, preventing exposure of the electron multiplying charge coupled device to gamma radiation;
wherein the at least one light detector measures energy deposited by gamma rays during one gamma event by integrating the amount of visible light received from the gamma-transparent apparatus during one gamma event; and
wherein the at least one light detector triggers acquisition of the image on detection of a gamma interaction.

20. The gamma radiation detecting apparatus of claim 19, further comprising:
a cooling device which cools the electron multiplying charge coupled device; and
a second electronic device connected to the first electronic device and running software to process the digital data and display the image, wherein the software extracts the position of a single gamma ray interaction from the image.

* * * * *